(12) United States Patent
Hyuga (10) Patent No.: US 11,330,198 B2
(45) Date of Patent: May 10, 2022

(54) IMAGE PROCESSOR AND IMAGE PROCESSING METHOD

(71) Applicant: Kabushiki Kaisha Toshiba, Tokyo (JP)

(72) Inventor: Fumihiko Hyuga, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 164 days.

(21) Appl. No.: 16/504,877

(22) Filed: Jul. 8, 2019

(65) Prior Publication Data

US 2019/0335113 A1    Oct. 31, 2019

Related U.S. Application Data

(62) Division of application No. 15/456,970, filed on Mar. 13, 2017, now abandoned.

(60) Provisional application No. 62/307,837, filed on Mar. 14, 2016.

(51) Int. Cl.
*H04N 5/265* (2006.01)
*H04N 5/235* (2006.01)

(52) U.S. Cl.
CPC .......... *H04N 5/265* (2013.01); *H04N 5/2353* (2013.01)

(58) Field of Classification Search
CPC .... H04N 5/265; H04N 5/2353; H04N 5/2355; H04N 5/2357; H04N 5/35563
See application file for complete search history.

(56) References Cited

U.S. PATENT DOCUMENTS

| | | | |
|---|---|---|---|
| 8,885,092 B2 | 11/2014 | Mori et al. | |
| 9,036,050 B2 | 5/2015 | Jo | |
| 2012/0113297 A1 | 5/2012 | Mori et al. | |
| 2012/0194686 A1* | 8/2012 | Lin | H04N 5/2355 348/208.4 |
| 2012/0281111 A1* | 11/2012 | Jo | G06T 5/003 348/229.1 |
| 2012/0287294 A1 | 11/2012 | Kaizu et al. | |

(Continued)

FOREIGN PATENT DOCUMENTS

| | | |
|---|---|---|
| JP | 2009-212909 A | 9/2009 |
| JP | 5188453 B2 | 4/2013 |

(Continued)

*Primary Examiner* — Sinh Tran
*Assistant Examiner* — Zhenzhen Wu
(74) *Attorney, Agent, or Firm* — Allen & Overy LLP (57) ABSTRACT

An image processor according to the present embodiment includes an acquirer, an output unit, and a generator. The acquirer acquires a first pixel value obtained by making a pixel value in a first image captured in a first exposure time correspond to a predetermined sensitivity and a second pixel value obtained by making a pixel value in a second image captured in a second exposure time shorter than the first exposure time correspond to the predetermined sensitivity. The output unit outputs a pixel value serving as a predetermined value larger than the second pixel value when the first pixel value has been saturated and the second pixel value corresponding to the first pixel value is less than the first pixel value. The generator generates a high dynamic range image using at least the first image and the second image based on the pixel value output by the output unit.

18 Claims, 9 Drawing Sheets

(56) References Cited

U.S. PATENT DOCUMENTS

| | | | |
|---|---|---|---|
| 2012/0314124 A1* | 12/2012 | Kaizu | H04N 5/2355 348/362 |
| 2014/0063294 A1 | 3/2014 | Tatsuzawa et al. | |
| 2014/0153839 A1* | 6/2014 | Tsuzuki | H04N 5/2357 382/254 |
| 2014/0192227 A1* | 7/2014 | Zhang | H04N 5/2355 348/230.1 |
| 2014/0375848 A1 | 12/2014 | Yamamoto et al. | |
| 2017/0013183 A1 | 1/2017 | Masuno et al. | |
| 2017/0041542 A1* | 2/2017 | Ono | H04N 5/23254 |
| 2017/0104913 A1* | 4/2017 | Wang | H04N 5/265 |
| 2017/0244914 A1 | 8/2017 | Bahar et al. | |

FOREIGN PATENT DOCUMENTS

| | | |
|---|---|---|
| JP | 2013-121099 A | 6/2013 |
| JP | 2013-219708 A | 10/2013 |

\* cited by examiner

IMAGE PROCESSOR AND IMAGE PROCESSING METHOD

CROSS REFERENCE TO RELATED APPLICATIONS

This application is a divisional of application Ser. No. 15/456,970, filed Mar. 13, 2017 and is based upon and claims the benefit of priority from the prior U.S. Provisional Patent Application No. 62/307,837, filed on Mar. 14, 2016, the entire contents of which are incorporated herein by reference.

FIELD

The present invention relates to an image processor and an image processing method.

BACKGROUND

To obtain a high dynamic range image serving as an image representing a wide dynamic range, a High Dynamic Range Imaging (HDRI) for synthesizing a long exposure image and a short exposure image captured in a shorter exposure time than the long exposure image has been performed. In the short exposure image, a flicker, a variation in pixel value depending on an image capture timing, can occur. Thus, in the HDRI, processing for reducing an effect of the flicker is required.

DETAILED DESCRIPTION

According to an aspect of the present invention, an image processor includes an acquirer, an output unit, and a generator. The acquirer acquires a first pixel value obtained by making a pixel value in a first image captured in a first exposure time correspond to a predetermined sensitivity and a second pixel value obtained by making a pixel value in a second image captured in a second exposure time shorter than the first exposure time corresponds to the predetermined sensitivity. The output unit outputs a pixel value serving as a predetermined value larger than the second pixel value when the first pixel value has been saturated and the second pixel value corresponding to the first pixel value is less than the first pixel value. The generator generates a high dynamic range image using at least the first image and the second image based on the pixel value output by the output unit.

Hereinafter, embodiments of the present invention will be described with reference to the drawings. The embodiments do not limit the present invention.

First Embodiment

An image processor according to an embodiment acquires a first pixel value obtained by making a pixel value in a long exposure image correspond to a reference sensitivity and a second pixel value obtained by making a pixel value in a short exposure image correspond to the reference sensitivity, and performs HDRI using the first pixel value when the first pixel value is saturated and the second pixel value is less than the first pixel value, to reduce an effect of a flicker occurring in the short exposure image. More details will be described below.

Figure 1:
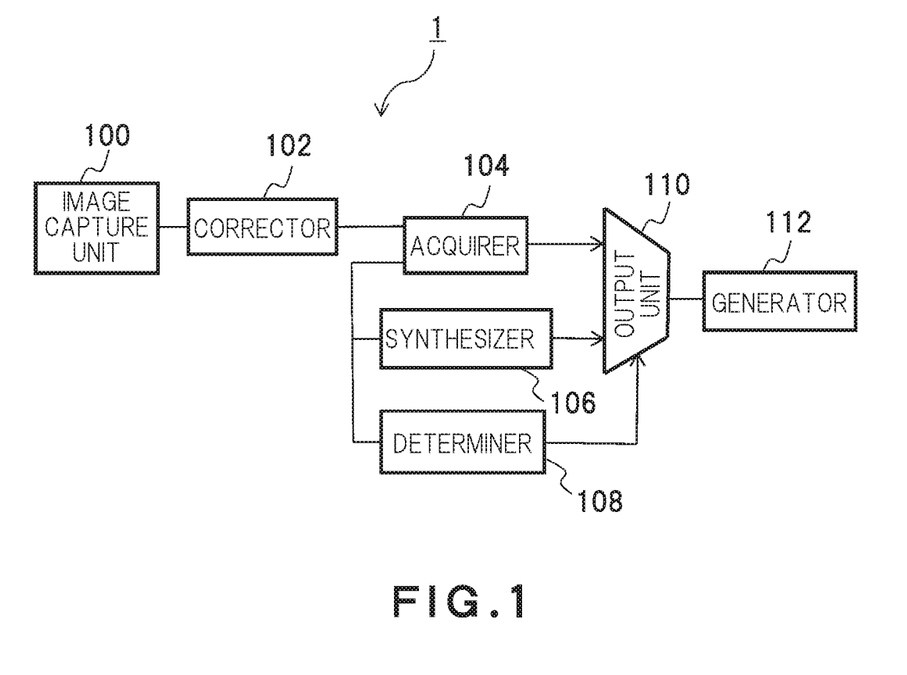
FIG. 1 is a block diagram illustrating an example of a configuration of an image processor according to an embodiment.

FIG. 1 is a block diagram illustrating an example of a configuration of the image processor 1 according to an embodiment. The image processor 1 is an apparatus which performs HDRI, and includes an image capture unit 100, a corrector 102, an acquirer 104, a synthesizer 106, a determiner 108, an output unit 110, and a generator 112.

The image capture unit 100 captures an image in a plurality of different exposure times. The image capture unit 100 is an image sensor in which pixels are arranged in a two-dimensional or planar shape, for example, and each of the pixels includes four sub-pixels. The sub-pixels have similar structures and different exposure times. Each of the sub-pixels, for example, consists of a photo-diode as its main component. That is, respective sensitivities of the four sub-pixels are determined depending on the exposure times. As the exposure time increases, the sensitivity increases. The four sub-pixels are a sub-pixel having a long exposure time (hereinafter referred to as a long exposure sub-pixel), a sub-pixel having a medium exposure time 2 (hereinafter referred to as a medium exposure 2 sub-pixel), a sub-pixel having a medium exposure time 1 (hereinafter referred to as a medium exposure 1 sub-pixel), and a sub-pixel having a short exposure time (hereinafter referred to as a short exposure sub-pixel) in descending order of the sensitivities. Thus, four different pixel values are obtained from the same pixel.

Thus, when the image capture unit 100 performs image capturing, an image captured in a long exposure time (hereinafter referred to as a long exposure image), an image captured in a medium exposure time 2 (hereinafter referred to as a medium exposure 2 image), an image captured in a medium exposure time 1 (hereinafter referred to as a medium exposure 1 image), and an image captured in a short exposure time (hereinafter referred to as a short exposure image) are obtained in descending order of sensitivities. The image capture unit 100 is used for a vehicle camera and a mobile camera, for example. The image processor 1 performs HDRI using at least two of the four images respectively captured in different exposure times.

The medium exposure 2 sub-pixel (an LED pixel) is a dedicated light emitting diode (LED) sub-pixel. That is, the medium exposure 2 sub-pixel which takes into consideration the characteristics of an LED light source. The LED sub-pixel is a pixel corresponding to characteristics such as illuminance of the LED light source and a flashing frequency (100 Hz or 120 Hz). For example, an exposure time having a length sufficient to suppress the occurrence of flicker is set in consideration of flashing frequency.

The corrector 102 is connected to the image capture unit 100, and corrects respective pixel values of a plurality of images obtained by the image capture unit 100 to corrected pixel values corresponding to a reference sensitivity. The reference sensitivity is the sensitivity of the long exposure sub-pixel. Thus, the corrector 102 performs the calculation: (corrected pixel value)=(correction coefficient)×(pixel value before correction). The correction coefficient is expressed by an equation: (correction coefficient)=(reference sensitivity)/(target sensitivity). The four sub-pixels constituting each of the pixels in the image capture unit 100 respectively have similar configurations, and each of the reference sensitivity and the target sensitivity is a value proportional to the length of the exposure time. Thus, the correction coefficient has a value equal to an exposure magnification. The respective exposure times of the four sub-pixels are an exposure time under long exposure (hereinafter referred to as a long exposure time) TL, an exposure time under medium exposure 2 (hereinafter referred to as a medium exposure 2 time) TM2, an exposure time under medium exposure 1 (hereinafter referred to as a medium exposure 1 time) TM1, an exposure time under short exposure (hereinafter referred to as a short exposure time) TS in descending order of the exposure times.

According to the above, the corrector 102 first performs the calculation: (exposure magnification under medium exposure 2 (hereinafter referred to as medium exposure 2 magnification) Rm2)=(long exposure time TL)/(medium exposure 2 time TM2), the calculation: (exposure magnification under medium exposure 1 (hereinafter referred to as medium exposure 1 magnification) Rm1)=(long exposure time TL)/(medium exposure 1 time TM1), and the calculation: (exposure magnification under short exposure (hereinafter referred to as a short exposure magnification) Rs)=(long exposure time TL)/(short exposure time TS). If the exposure time TL is 12 ms, and the exposure time TS is 6 ms, for example, Rs=2.

Then, the corrector 102 performs the calculation: (corrected pixel value)=(exposure magnification)×(pixel value before correction) and (exposure magnification)=(correction coefficient). A pixel value in the long exposure image, a pixel value in the medium exposure 2 image, a pixel value in the medium exposure 1 image, and a pixel value in the short exposure image are respectively indicated by L, M2, M1, and S. The respective corrected pixel value are respectively indicated by L', M2', M1', and S'. For example, the corrected pixel value S' in the short exposure image is obtained as (corrected pixel value S')=(exposure magnification Rs)×(pixel value S in short exposure image).

The acquirer 104 is connected with the corrector 102, and acquires the corrected pixel value L', M2', M1', S'. That is, the acquirer 104 acquires the corrected pixel value obtained by making the pixel value in each of the plurality of images correspond to the reference sensitivity. Since the long exposure magnification RL is 1, the corrected pixel value L' is equal to the pixel value L in the long exposure image.

The corrector 102 may be provided in the image capture unit 100. Alternatively, the corrector 102 may be provided in the acquirer 104.

The synthesizer 106 is connected to the acquirer 104, and acquires a composite value using any one of the corrected pixel values L', M2', M1', and S'. That is, the synthesizer 106 calculates a composite value obtained by synthesizing the plurality of corresponding corrected pixel values at a predetermined ratio. When a predetermined ratio α is taken as 0.5, for example, a composite value G' is calculated by an equation: (composite value G' (L', S'))=(1−α)×(corrected pixel value L')+α×(corrected pixel value S').

The composite value may be calculated by an equation: (composite value G' (L, S))=(1−α)×F1(pixel value L)+α×F2(pixel value S). F1(L) and F2(S) are respectively functions of the pixel value L and the pixel value S. That is, the composite value may be calculated using any one of the pixel values L, M2, M1, S. For example, α may be changed according to the pixel value L.

The determiner 108 is connected to the acquirer 104. The determiner 108 determines which of the corrected pixel values L', M2', M1', and S' and the composite pixel value G' is to be output depending on any one of the corrected pixel values L', M2', M1', and S' and the composite pixel value G'.

The output unit 110 is connected to the acquirer 104, the synthesizer 106, and the determiner 108, and outputs a pixel value according to the determination by the determiner 108. That is, the output unit 110 outputs any one of the corrected pixel values L', M2', M1', and S' and the composite pixel value G'.

The generator 112 is connected to the output unit 110, and generates a high dynamic range image using at least two of the long exposure, the medium exposure 2, the medium exposure 1, and the short exposure. The image generated is output to a monitor, a printer, or the like. The generator 112 may perform image processing such as frequency processing and hierarchy conversion processing for the generated image. The monitor may display a moving image or display a still image using a plurality of images obtained by HDRI.

Figure 2:
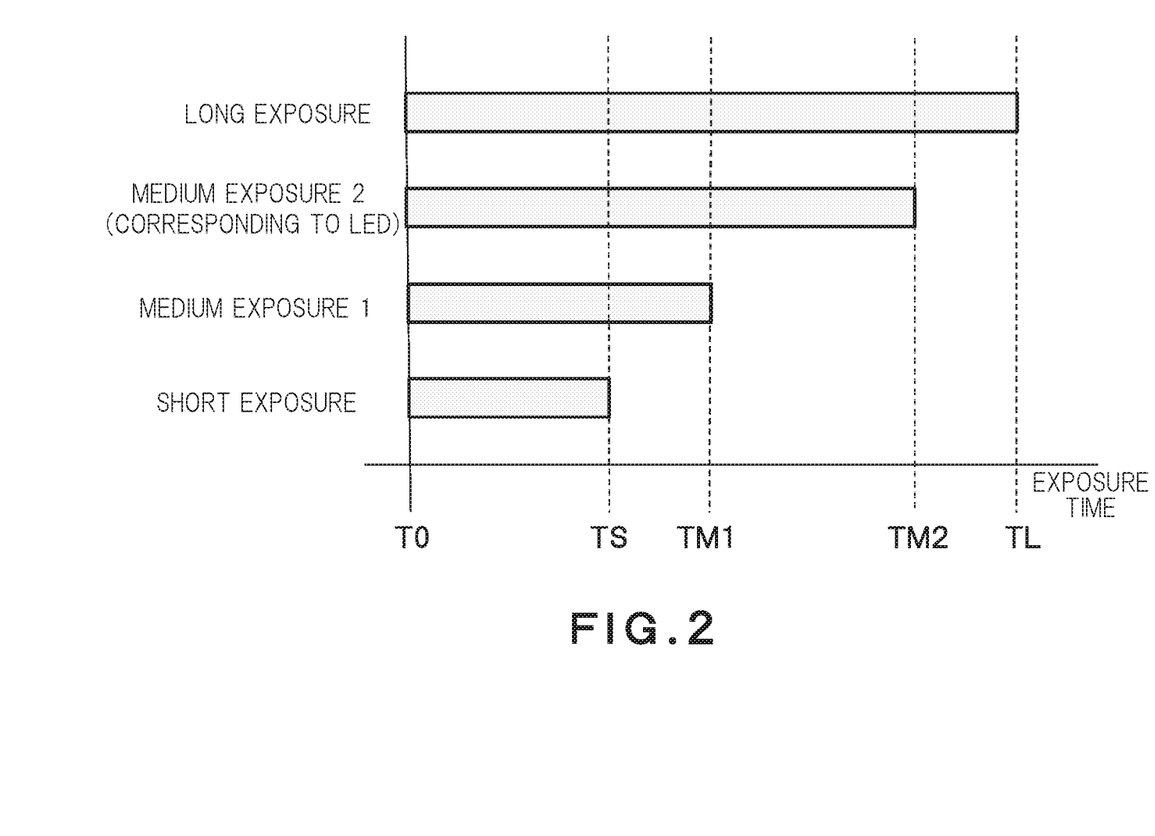
FIG. 2 is a diagram illustrating a relationship between a sub-pixel and an exposure time.

The respective exposure times of the four sub-pixels constituting the pixel in the image capture unit 100 will be described below with reference to FIG. 2. FIG. 2 illustrates a relationship between a sub-pixel and an exposure time. A horizontal axis represents an exposure time, and a vertical axis represents the type of sub-pixel. Each of the sub-pixels starts image capturing at a time T0. Then, when an exposure time TS elapses, the short exposure sub-pixel stops image capturing. Then, when an exposure time TM1 elapses, the medium exposure 1 sub-pixel stops image capturing. When an exposure time TM2 elapses, the medium exposure 2 sub-pixel stops the image capturing. When an exposure time TL elapses, the long exposure sub-pixel stops image capturing. Thus, the sub-pixels are configured to simultaneously start and stops image capturing in ascending order of the exposure times. The light exposure time may be called an exposure time or a shutter speed. The four sub-pixels may have different exposure start times.

Figure 3:
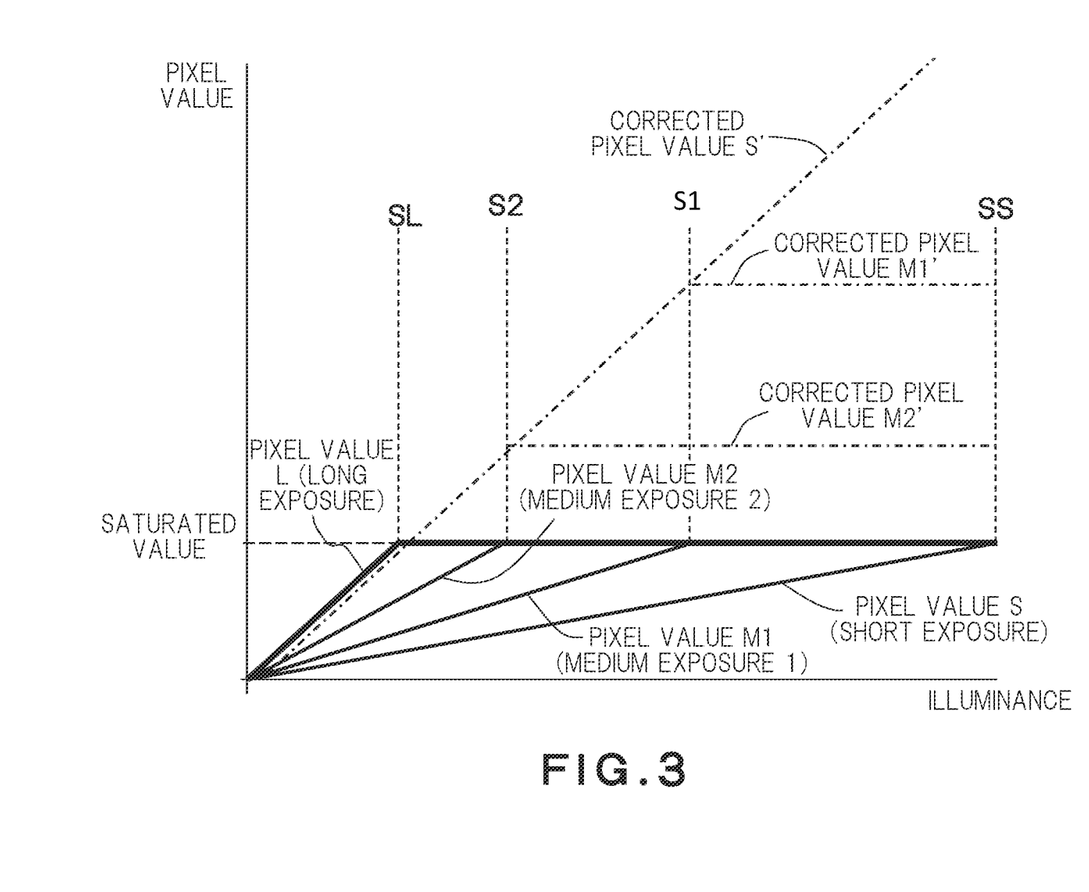
FIG. 3 is a diagram illustrating a relationship between illuminance of light irradiated onto a sub-pixel and a pixel value.

FIG. 3 illustrates the relationship between illumination of light irradiated onto a sub-pixel and a pixel value. A horizontal axis represents illuminance, and a vertical axis represents a pixel value. A solid line represents a pixel value, and a broken line represents a corrected pixel value.

As illustrated in FIG. 3, the pixel value L increases in proportion to the illuminance, and is saturated when the illuminance is not less than SL. The pixel value M2 also increases in proportion to the illuminance, and is saturated when the illuminance is not less than S2. The pixel value M1 also increases in proportion to the illuminance, and is saturated when the illuminance is not less than S1. Similarly, the pixel value also increases in proportion to the illuminance, and is saturated when the illuminance is not less than SS.

And, corrected pixel value M2', M1', and S' are corrected to correspond to the exposure time of the long exposure sub-pixel. Thus, each of the corrected pixel values has the same increase rate to an increase rate of the pixel value L against the illuminance until saturated.

As can be seen from the foregoing, in image capturing with light having illuminance of less than SL, any of four images has not been saturated. In this illuminance range, respective contrasts and Signal-to-Noise (S/N) ratios of the long exposure image, the medium exposure 2 image, the medium exposure 1 image, and the short exposure image decrease in this order. Thus, the long exposure image is mainly used for HDRI in the image processor 1.

Then, when the illuminance is not less than SL and less than S2, the medium exposure 2 image, the medium exposure 1 image, and the short exposure image have not been saturated. In this illuminance range, the respective contrasts and S/N ratios of the medium exposure 2 image, the medium exposure 1 image, the short exposure image decrease in this order. Thus, the medium exposure 2 image is mainly used for HDRI.

Then, when the illuminance is not less than SL and less than S1, the medium exposure 1 image and the short exposure image have not been saturated. In this illuminance range, the respective contrasts and S/N ratios of the medium exposure 1 image and the short exposure image decrease in this order. Thus, the medium exposure 1 image is mainly used for HDRI.

Then, when the illuminance is not less than S2 and less than SS, the short exposure image has not been saturated. In this illuminance range, the short exposure image is mainly used for HDRI.

In the image capture unit 100, the image capturing may be performed four times by changing the exposure time. In this case, each of the pixels can be composed of one sub-pixel. Similar sub-pixels or different sub-pixels may be respectively used for the four sub-pixels. If the different sub-pixels are used, an aperture ratio may be changed for each of the sub-pixels, or a material may be changed for each of the sub-pixels. Alternatively, an amplification factor may be changed for each of the sub-pixels.

Figure 4:
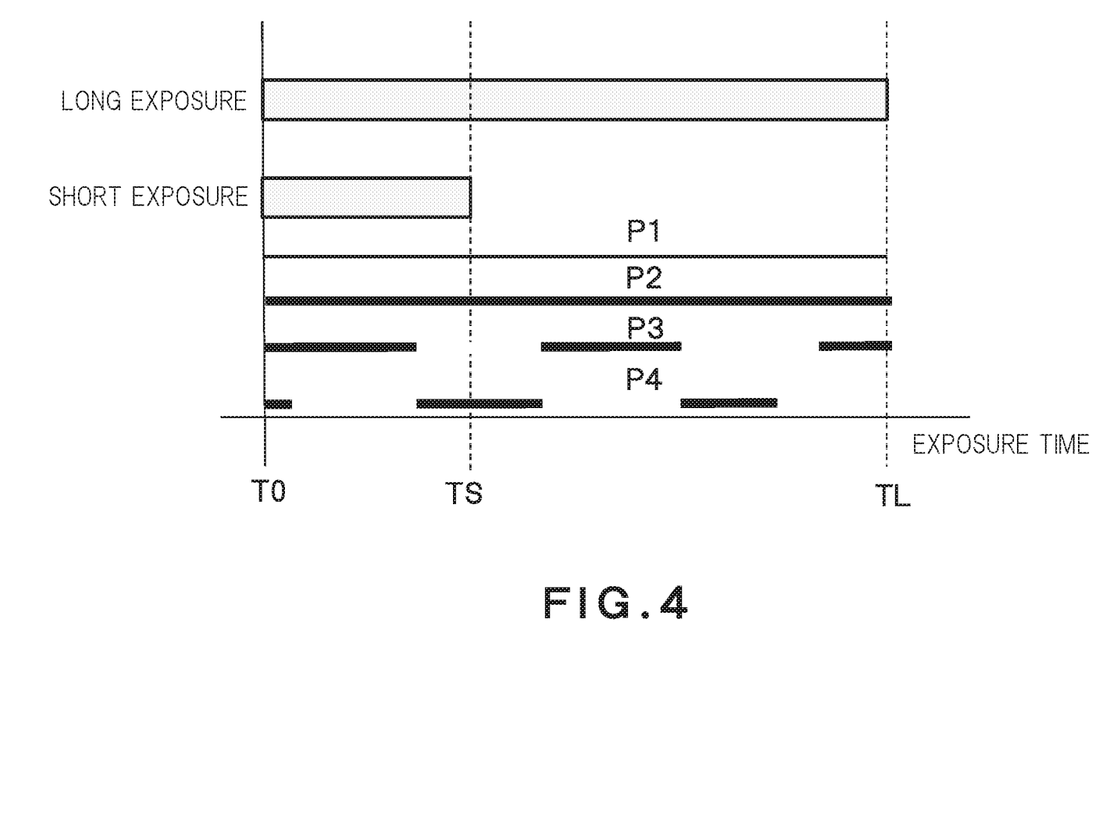
FIG. 4 is a diagram illustrating a relationship between an exposure time of a sub-pixel and an illumination pattern.

A flicker appearing in the short exposure image will be described below with reference to FIGS. 4 and 5. FIG. 4 illustrates a relationship between an exposure time of a sub-pixel and an illumination pattern P1, P2, P3, and P4. A horizontal axis represents an exposure time, and a vertical axis represents the type of exposure length. Like in FIG. 2, the short exposure sub-pixel starts image capturing at time T0, and ends the image capturing after a lapse of an exposure time TS. The long exposure sub-pixel starts image capturing at time T0, and ends the image capturing after a lapse of an exposure time TL.

The illumination pattern P1 is continuously irradiated onto each of the sub-pixels at illuminance K1. The illuminance K1 is illuminance at which the long exposure sub-pixel is not saturated. The illuminance is schematically indicated by the thickness of a line. The illumination pattern P2 is continuously irradiated onto each of the sub-pixels at illuminance K2. At the illuminance K2, the short exposure sub-pixel is not saturated, and the long exposure sub-pixel is saturated.

The illumination patterns P3 and P4 respectively schematically represent illumination patterns of the LED light source in a traffic light, for example. That is, the illumination patterns P3 and P4 periodically flash at illuminance equal to the illuminance K2. The periodic illumination pattern is approximately 100 Hz or approximately 120 Hz, for example, and looks like continuous light to the naked eye.

The illumination pattern P3 starts to be irradiated simultaneously with a timing T0 at which the short exposure sub-pixel starts image capturing. On the other hand, the illumination pattern P4 starts to be irradiated at a timing before the end of the exposure time TS.

Then, respective pixel values and corrected pixel values obtained when the illumination patterns P1, P2, P3, and P4 illustrated in FIG. 4 are irradiated onto each of the sub-pixels will be described below. FIG. 5 is a diagram illustrating a relationship between an illumination pattern and a pixel value. A horizontal axis represents illuminance, and a vertical axis represents a pixel value. A solid line represents a pixel value, and a broken line represents a corrected pixel value.

Figure 5:
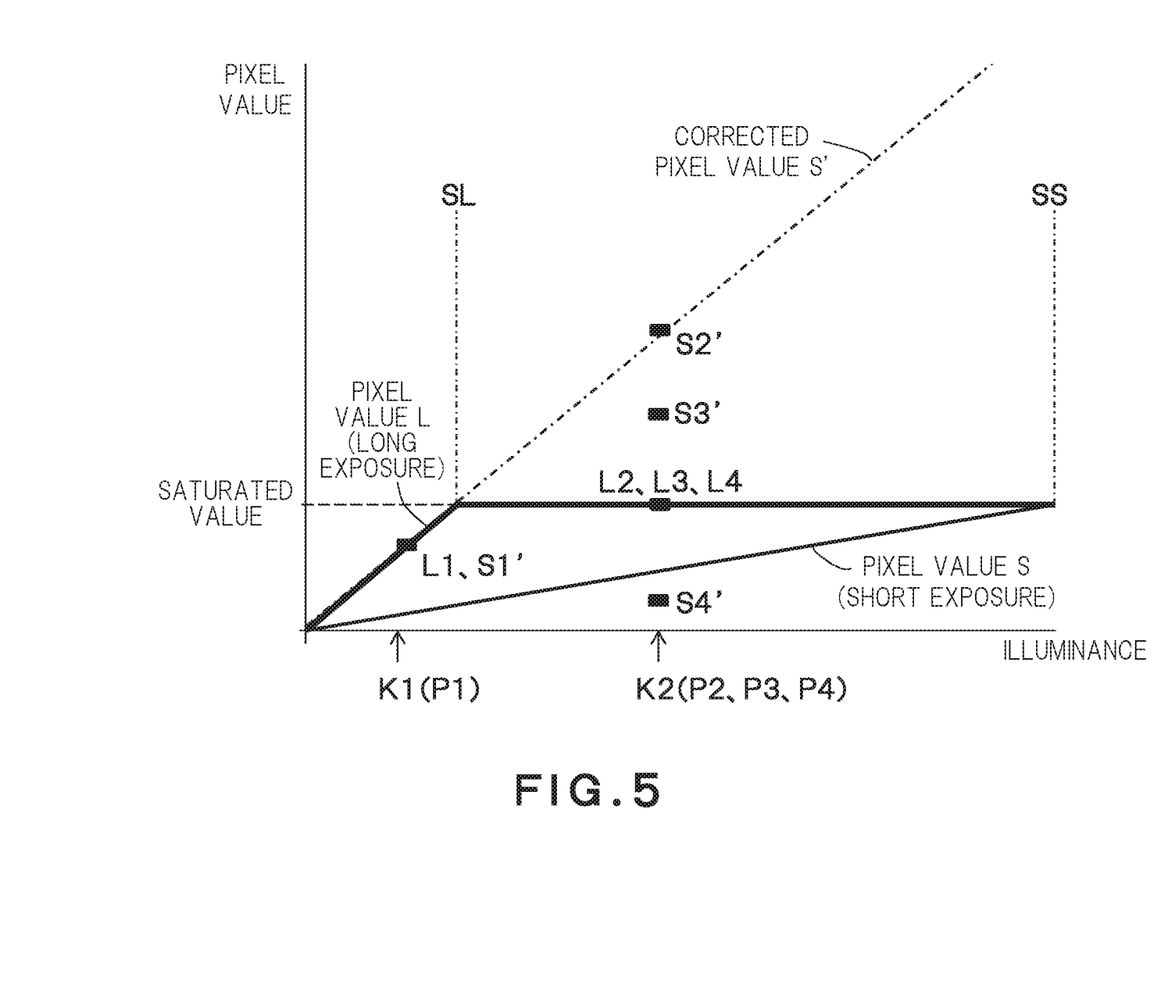
FIG. 5 is a diagram illustrating a relationship between an illumination pattern and a pixel value.

Respective illuminances of the illumination patterns P1, P2, P3, and P4 illustrated in FIG. 4 are indicated by arrows P1, P2, P3, and P4 in FIG. 5. A square L1 illustrated in FIG. 5 indicates a pixel value in the illumination pattern P1 captured by the long exposure sub-pixel, and S1' indicates a corrected pixel value in the illumination pattern P1 captured by the short exposure sub-pixel. The illuminance of the illumination pattern P1 is less than SL. Therefore, the pixel value L1 in the long exposure image has not been saturated. Thus, the pixel value L1 and the corrected pixel value S1' substantially become equal to each other.

A square L2 indicates a pixel value in the illumination pattern P2 captured by the long exposure sub-pixel, and S2' indicates a corrected pixel value in the illumination pattern P2 captured by the short exposure sub-pixel. The illuminance of the illumination pattern P2 is not less than SL. Therefore, the pixel value L2 in the long exposure image is saturated, and becomes equal to a saturated value. On the other hand, the illuminance of the illumination pattern P2 is less than SS. Therefore, the corrected pixel value S2' in the short exposure image has not been saturated. Thus, the corrected pixel value S2' is more than the pixel value L2.

Furthermore, a square L3 indicates a pixel value in the illumination pattern P3 captured by the long exposure sub-pixel, and S3' indicates a corrected pixel value in the illumination pattern P3 captured by the short exposure sub-pixel. The illumination pattern P3 is irradiated with a sufficient amount of light to saturate the long exposure sub-pixel, although flashing. Thus, the pixel value L3 in the long exposure image represents a saturated value.

Furthermore, the illumination pattern P3 is periodically flashing. Therefore, the corrected pixel value S3' becomes less than the corrected pixel value S2'. On the other hand, a ratio of overlapping of an exposure time and an irradiation time of the short exposure sub-pixel becomes large, as illustrated in FIG. 4. Thus, the corrected pixel value S3' becomes more than the pixel value L3, as illustrated in FIG. 5.

A square L4 indicates a pixel value in the illumination pattern P4 captured by the long exposure sub-pixel, and S4' indicates a corrected pixel value in the illumination pattern P4 captured by the short exposure sub-pixel. The pixel value L4 in the long exposure image represents a saturated value, like in the illumination pattern P3.

However, the illumination pattern P4 is only irradiated during a part of the exposure time of the short exposure sub-pixel, as illustrated in FIG. 4. Thus, the corrected pixel value S4' becomes less than the saturated pixel value L4, as illustrated in FIG. 5.

As can be seen from the foregoing, as the pixel value in the short exposure image, the corrected pixel values S3' and S4' vary depending on an image capture timing. In this case, the pixel values S3 and S4 also vary. Thus, an image which looks as if an LED light source disappeared, for example, may be obtained depending on an image capture timing. A short exposure image looks as if it were flashing when viewed in a moving image. Such a phenomenon is referred to as a flicker. A flicker, which appears when the LED light source is captured, is referred to as an LED flicker phenomenon.

If the illumination pattern P2 is continuously irradiated during the exposure time TS, and the pixel value L2 has been saturated, the corrected pixel value S2' always becomes more than the pixel value L2. Similarly, if the illumination pattern 2 is continuously irradiated at illuminance made lower than K2, when the pixel value in the long exposure image is saturated, the corrected pixel value S2' in the short exposure image becomes more than the saturated pixel value L2 in the long exposure image.

Thus, a combination of the corrected pixel value S3' and the saturated pixel value L3 each obtained in the illumination pattern P3 is also obtained even by continuous irradiation at illuminance made lower than K2. In normal shooting, the illuminance of light irradiated onto the sub-pixel is unclear. Thus, when the corrected pixel value S3' is not less than the saturated pixel value L3, it cannot be determined whether the illumination pattern P3 has been irradiated during a part of the exposure time TS only under this condition.

On the other hand, the corrected pixel value S4' becomes less than the saturated pixel value L4, as obtained in the illumination pattern P4, only when the illumination light has been irradiated during a part of the exposure time TS. Thus, when the pixel value L4 in the illumination pattern P4 is saturated, and the corrected pixel value S4' in the illumination pattern P4 is less than the saturated pixel value L4, the illumination light has been irradiated only during a part of the exposure time TS.

Thus, as the exposure time decreases, a flicker more easily occurs. In general HDRI, if the pixel value L has been saturated, a high dynamic range image is generated primarily using the corrected pixel value S'. Thus, in general HDRI, an image, which looks as if a light source periodically flashing, like the LED light source, disappeared depending on a shooting timing, is generated.

Figure 6:
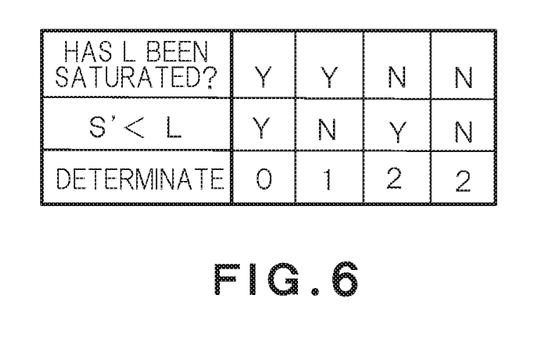
FIG. 6 is a diagram illustrating a determination table used when two types of images respectively captured in different exposure times are subjected to HDRI processing.

Then, an example of HDRI processing for reducing an effect of such a flicker and obtaining a high dynamic range image will be described below. FIG. 6 illustrates a determination table used when two types of images respectively captured in different exposure times are subjected to HDRI processing. This determination table is used by the determiner 108 when HDRI processing is performed using the pixel value L and the corrected pixel value S', for example. If two images respectively captured in different exposure times are acquired, the image captured in the longer exposure time is a long exposure image (first image), and the image captured in the shorter exposure time is a short exposure image (second image). The length of the exposure time is not limited.

The determiner 108 in FIG. 6 determines whether the pixel value L has been saturated (YES or NO), and determines whether the corrected pixel value S' is less than a corresponding pixel value L (YES or NO). A determination result is output as signals 0, 1, and 2 to the output unit 110.

In the determination table, when the determination result is the signal 0, it is determined that a flicker has occurred in the corrected pixel value S'. That is, if the pixel value L is saturated, and the corrected pixel value S' corresponding to the pixel value L is less than the pixel value L, it is determined that a flicker has occurred in the corrected pixel value S'.

Thus, the determiner 108 determines whether a flicker has occurred using the pixel value L and the corresponding corrected pixel value S'. If the pixel value L is a larger than or equal to predetermined value, e.g., 1023 or if the corrected pixel value S' is a predetermined value, the determiner 108 determines that the pixel value has been saturated.

A state where a flicker has occurred means a state where a sub-pixel is illuminated from a light source which flashes and a pixel value output by the sub-pixel varies depending on an image capture timing. A case where a flicker has occurred in a pixel value means a case where a pixel value obtained by actual image capturing is less than a pixel value obtained by continuous irradiation using the same illuminance, that is, a state where a ratio of an illumination time of a light source which flashes to a exposure time of a sub-pixel used to capture the light source and obtain a pixel value is less than a predetermined value.

Figure 7:
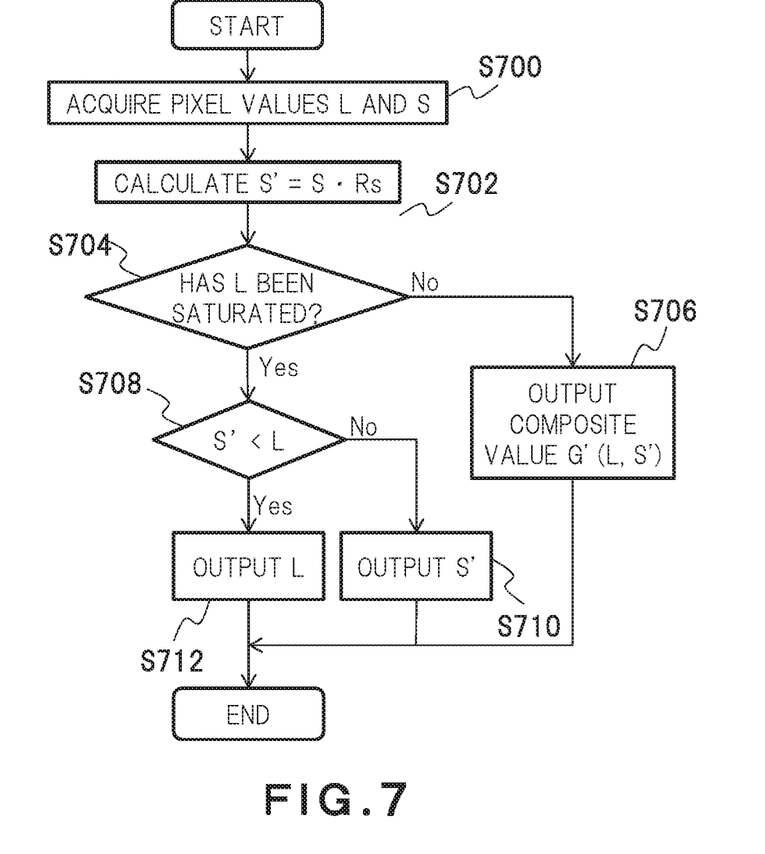
FIG. 7 is a flowchart illustrating HDRI processing according to the determination table.

FIG. 7 is a flowchart illustrating HDRI processing according to a determination table. The corrector 102 acquires a pixel value L in a long exposure image (first image) and a pixel value S in a short exposure image (second image) from the image capture unit 100 (S700). Then, the corrector 102 calculates a corrected pixel value L' of the pixel value L and a corrected pixel value S' of the pixel value S (S702). Since a exposure magnification RL is 1, the corrected pixel value L' is equal to the pixel value L.

Then, the determiner 108 determines whether the pixel value L has been saturated (S704). If the pixel value L is or over a predetermined value, e.g., 1023, the determiner 108 determines that the pixel value L has been saturated. If the pixel value L has not been saturated (NO in S704), the determiner 108 then outputs a signal 2 to the output unit 110, and outputs a composite value G' (L, S') from the output unit 110 (S706). This composite value G' (L, S') is calculated by an equation: (composite pixel value G' (L', S'))=(1−α)×(pixel value L)+α×(corrected pixel value S'), where α=0.2, for example, in the synthesizer 106. If the pixel value L has not been saturated, an S/N ratio and a contrast of a long exposure image are respectively higher than an S/N ratio and a contrast of a short exposure image, and thus a synthesis ratio of the pixel value L is increased.

On the other hand, if the pixel value L has been saturated (YES in S704), the determiner 108 determines whether the corrected pixel value S' is less than the pixel value L (S708). If the corrected pixel value S' is not less than the pixel value L (NO in S708), the determiner 108 outputs the corrected pixel value S' from the output unit 110 (S710). If the corrected pixel value S' is less than the pixel value L (YES in S708), the determiner 108 then outputs a signal 0 to the output unit 110, and outputs the pixel value L from the output unit 110 (S712), and the processing ends. While a flow of processing corresponding to one pixel has been described in FIG. 6, the same processing is also performed for other pixel values constituting a long exposure image and a short exposure image. In a process in step S712, if a pixel value larger than the corrected pixel value S' is output, an effect of a flicker can be reduced. Thus, a pixel value, which is not less than a saturated pixel value of the pixel value L and is less than a saturated pixel value of the corrected pixel value S', for example, may be output from the output unit 110. In this case, the pixel value to be output from the output unit 110 may be a constant or a variable value.

If the pixel value L has not thus been saturated, the determiner 108 outputs a composite value G' (L, S'), to improve an image quality at low illuminance. On the other hand, if the pixel value L has been saturated, and the corrected pixel value S' is not less than the pixel value L, the corrected pixel value S' is output. Thus, a higher dynamic range image than that when only the long exposure image is used can be obtained.

Furthermore, if the pixel value L has been saturated, and the corrected pixel value S' corresponding to the pixel value L is less than the pixel value L, the pixel value L is output. That is, if the determiner 108 determines that a flicker has occurred in the corrected pixel value S', the determiner 108 outputs the pixel value L from the output unit 110. The determination processing prevents a pixel value to be output to the output unit 110 from being less than the pixel value L. Thus, even if a flicker has occurred in the pixel value S, an effect on an image after HDRI processing is reduced. Thus, an effect of the flicker can be reduced, and a high dynamic range image can be obtained.

Figure 8:
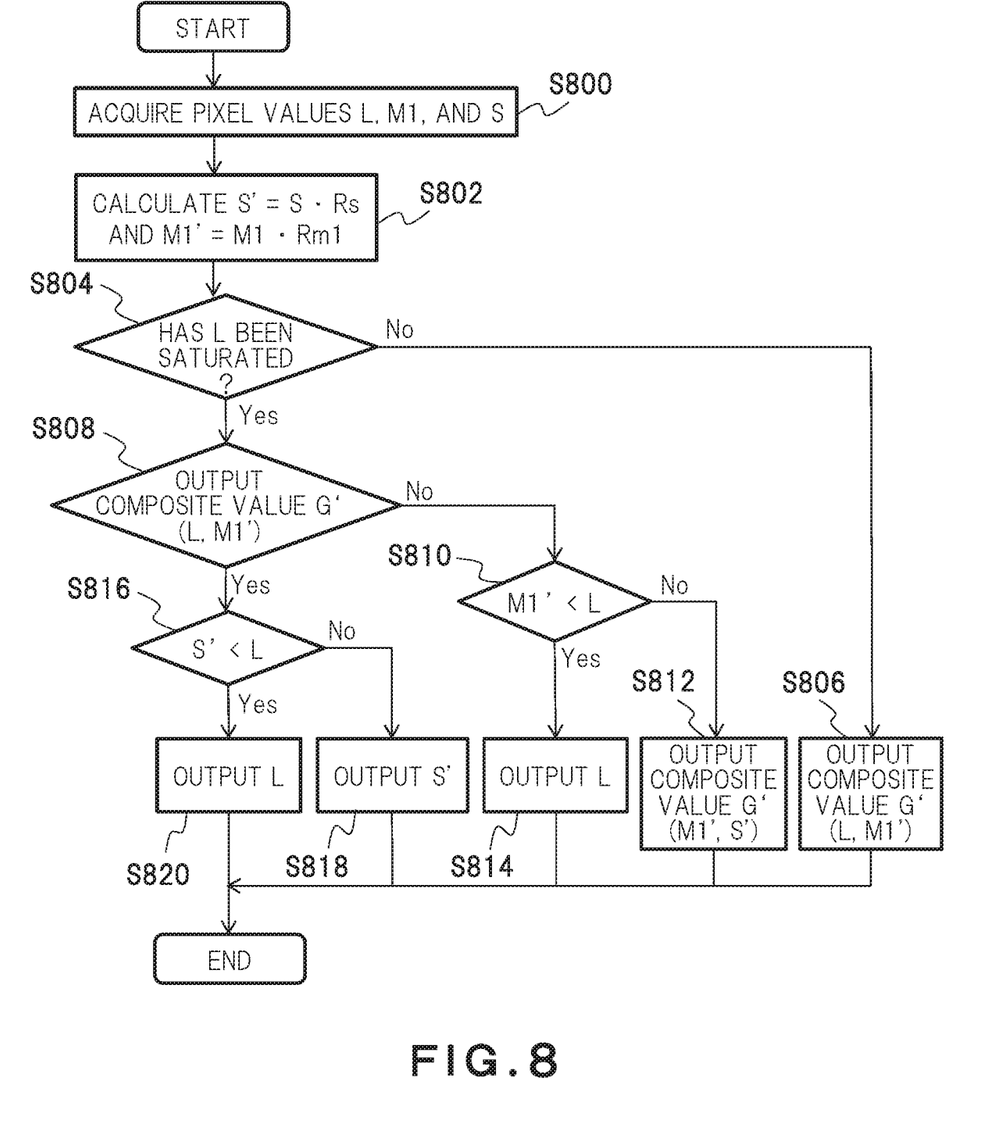
FIG. 8 is a flowchart illustrating HDRI processing performed for three types of images respectively captured in different exposure times.

Another example of HDRI processing for reducing an effect of a flicker while obtaining a high dynamic range image will be described below. FIG. 8 is a flowchart illustrating HDRI processing using three types of images respectively captured in different exposure times. HDRI processing using a long exposure image (first image), a medium exposure 1 image (third image), and a short exposure image (second image) will be described below. The HDRI processing differs from the processing illustrated in FIG. 7 by also using the medium exposure 1 image therefor.

The corrector 102 acquires a pixel value L in the long exposure image, a pixel value M1 in the medium exposure 1 image, and a pixel value S in the short exposure image from the image capture unit 100 (S800). Then, the corrector 102 calculates a corrected pixel value M1' of the pixel value M1 and a corrected pixel value S' of the pixel value S (S802).

Then, the determiner 108 determines whether the pixel value L has been saturated (S804). If the pixel value L has not been saturated (NO in S804), the determiner 108 then outputs a composite value G' (L, M1') from the output unit 110 (S806). This composite value G' (L, M1') is calculated by an equation: (composite pixel value G' (L, M1'))=(1−α)× (pixel value L)+α×(corrected pixel value M1'), where α=0.3, for example, in the synthesizer 106.

On the other hand, if the pixel value L has been saturated (YES in S804), the determiner 108 determines whether the corrected pixel value M1' has been saturated (S808). If the corrected pixel value M1' has not been saturated (NO in S808), the determiner 108 determines whether the corrected pixel value M1' is less than the pixel value L (S810). If the corrected pixel value M1' is not less than the pixel value L (NO in S810), the determiner 108 outputs a composite value G' (M1', S') from the output unit 110 (S812). This composite value G' (M1', S') is calculated by an equation: composite pixel value G' (M1', S'))=(1−α)×(corrected pixel value M1')+α×(corrected pixel value S'), where α=0.3, for example, in the synthesizer 106. On the other hand, if the corrected pixel value M1' is less than the pixel value L (YES in S810), the determiner 108 outputs the pixel value L from the output unit 110 (S814).

On the other hand, if the corrected pixel value M1' has been saturated (YES in S808), the determiner 108 determines whether the corrected pixel value S' is less than the pixel value L (S816). If the corrected pixel value S' is not less than the pixel value L (NO in step S816), the determiner 108 outputs the corrected pixel value S' from the output unit 110 (S818). On the other hand, if the corrected pixel value S' is less than the pixel value L (YES in S816), the determiner 108 outputs the pixel value L from the output unit 110 (S820), and the processing ends.

If the pixel value L has not thus been saturated, the determiner 108 outputs a composite value G' (L, M1'), in which the ratio of the pixel value L is increased, to the output unit 110. If the pixel value L has been saturated, and the corrected pixel value M1' has not been saturated, the determiner 108 outputs a composite value G' (M1', S'), in which the ratio of the pixel value M1' is increased, from the output unit 110. Thus, a composite value having a high S/N ratio and a high contrast can be output depending on illuminance.

If the pixel value L has been saturated, and the corrected pixel value M1' corresponding to the pixel value L is less than the pixel value L, the determiner 108 outputs the pixel value L from the output unit 110. Thus, even if a flicker has occurred in the pixel value M1 in the medium exposure 1 image, an image can be generated using the pixel value L. Thus, an effect of the flicker on the processed image can be reduced.

Even if a flicker has occurred in the corrected pixel value S', an image can be generated using the pixel value L, like in the processing illustrated in FIG. 6. Thus, even if a flicker occurs in either one of a short exposure image and a medium exposure 1 image, an effect of the flicker can be reduced. Thus, a high dynamic range image is generated while a flicker such as an LED flicker can be reduced occurring in a processed image.

Figure 9:
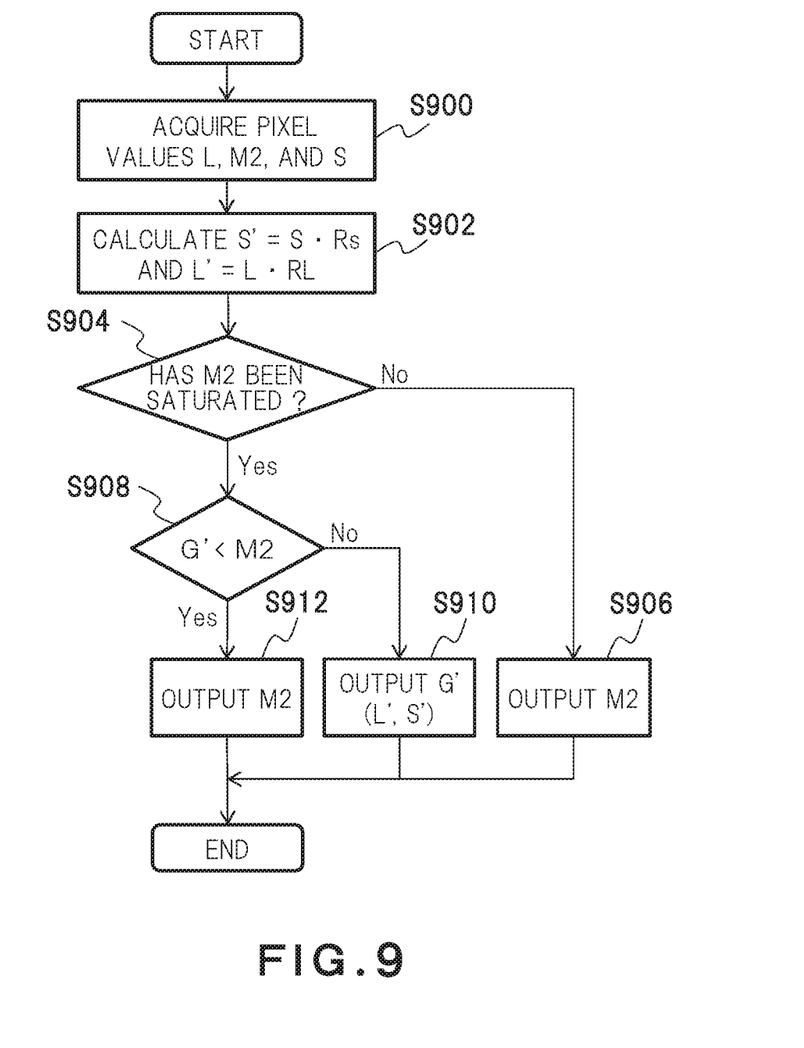
FIG. 9 is a flowchart illustrating HDRI processing performed when a light emitting diode (LED) light source is captured.

FIG. 9 is a flowchart illustrating HDRI processing performed when an LED light source is captured. The HDRI processing differs from the processing illustrated in FIG. 8 by using a long exposure image, a medium exposure 2 image, and a short exposure image therefor. A sub-pixel, which has captured the medium exposure 2 image, as described above, is a sub-pixel for an LED having an exposure time adjusted to match characteristics of the LED light source. A case where the LED light source such as a traffic light is included in a shooting target, and HDRI is performed mainly using the medium exposure 2 image will be described.

The corrector 102 acquires a pixel value L in a long exposure image (first image), a pixel value M2 in a medium exposure 2 image (fourth image), and a pixel value S in a short exposure image (second image) from the image capture unit 100 (S900). Then, the corrector 102 calculates a corrected pixel value L' of the pixel value L and a corrected pixel value S' of the pixel value S (S902). The sensitivity of the sub-pixel, which has captured the medium exposure 2 image, is taken as a reference sensitivity. In this case, an exposure magnification RL is less than 1. Therefore, the corrected pixel value L' becomes less than the pixel value L.

Then, the determiner 108 determines whether the pixel value M2 has been saturated (S904). If the pixel value M2 has not been saturated (NO in S904), the determiner 108 then outputs the pixel value M2 to the output unit 110 (S906).

On the other hand, if the pixel value M2 has been saturated (YES in S904), the determiner 108 determines whether a composite value G' (L', S') is less than the pixel value M2 (S908). The composite value G' (L', S') is calculated by an equation: (composite pixel value G' (L', S'))= (1−α)×L'+α×S', if L' is not less than w', α=1.0. On the other hand, if L' is less than w', α=L'/w'. Thus, if the composite value G' (L', S') has a similar characteristic to that of the corrected pixel value S', and a flicker has occurred in the corrected pixel value S', the composite value G' (L', S') becomes less than the pixel value M2.

If the composite value G' (L', S') is not less than the pixel value M2 (NO in S908), the determiner 108 outputs the composite value G' (L', S') from the output unit 110 (S910). On the other hand, if the composite value G' (L', S') is less than the pixel value M2 (YES in S908), the determiner 108 outputs the pixel value M2 to the output unit M2 (S912), and the processing ends.

If the pixel value M2 has not thus been saturated, the determiner 108 outputs the pixel value M2 to the output unit 110. Since the LED light source is a main shooting target, the pixel value M2, which has been adjusted to an LED characteristic, is preferentially used. If a flicker has occurred in the corrected pixel value S', the composite value G' (L, S') becomes less than the pixel value M2. Therefore, when the pixel value M2 is output to the output unit 110, an effect of the flicker can be reduced. If the pixel value M2 has been saturated, and a flicker has not occurred in the corrected pixel value S', the composite value G' (L, S') can be output to the output unit 110. The corrected pixel value S' accounts for a main percentage of the composite value G' (L, S'). Therefore, a high dynamic range image having a wider dynamic range can be generated. Thus, the high dynamic range image is generated while an effect of an LED flicker can be reduced.

Figure 10:
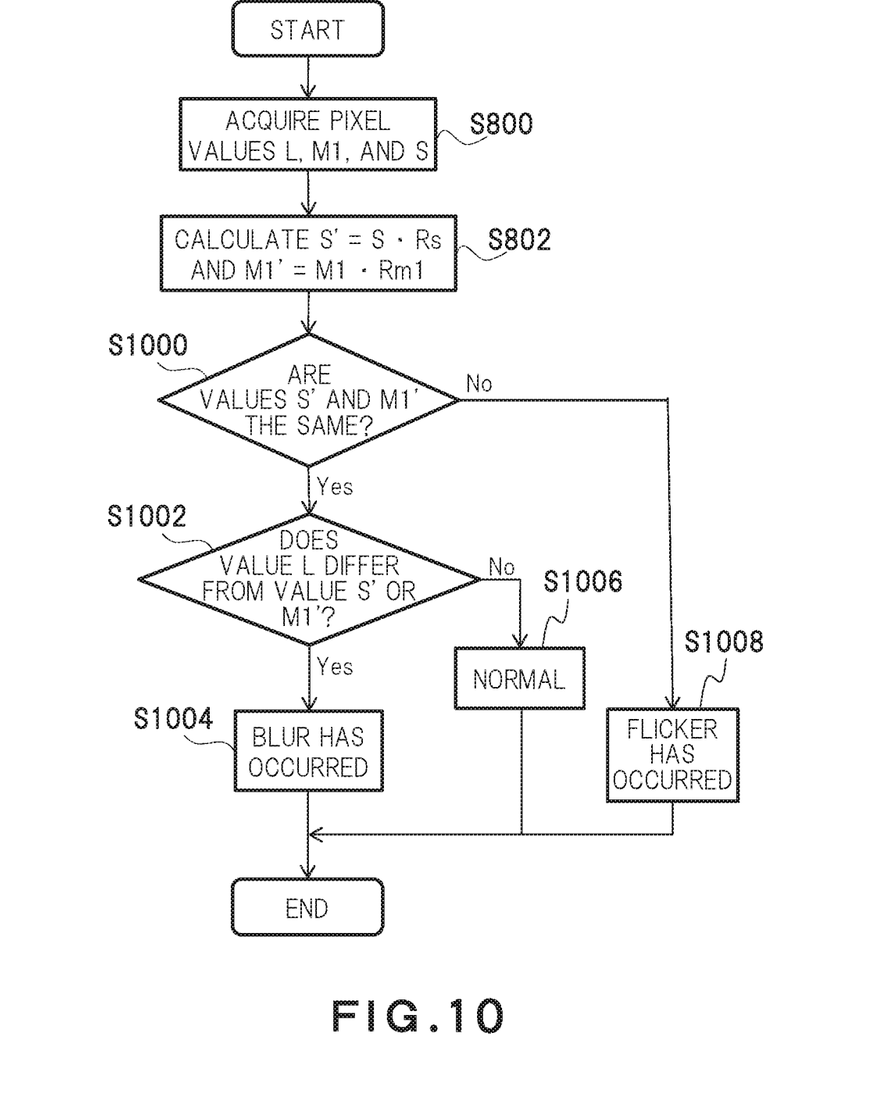
FIG. 10 is a flowchart illustrating processing for determining a flicker and a blur using three types of images respectively captured in different exposure times.

An example of processing for determining a flicker and blur will be described below. FIG. 10 is a flowchart illustrating processing for determining a flicker and a blur using three types of images respectively captured in different exposure times. HDRI processing using a long exposure image (first image), a medium exposure 1 image (third image), and a short exposure image (second image) will be described below. Similar processes to those illustrated in FIG. 8 are assigned the same reference numerals, and hence description thereof is not repeated.

The determiner 108 determines whether a difference between a corrected pixel value S' and a corrected pixel value M1' is within a first predetermined rang of value (S1000). If the difference between the corrected pixel value S' and the corrected pixel value M1' is within the first predetermined rang of value (YES in S1000), the determiner 108 determines whether a difference between the pixel value L and the corrected pixel value S' or the corrected pixel value M1' exceeds a second predetermined value (S1002). If the difference between the pixel value L and the corrected pixel value S' or the corrected pixel value M1' exceeds the second predetermined value. (YES in S1002), the determiner 108 determines that a blur has occurred (S1004). On the other hand, if the pixel value L is the same as the positive pixel value S' or the corrected pixel value M1' (NO in S1002), the determiner 108 determines that a situation is normal, i.e., neither a flicker nor a blur has occurred (S1006).

On the other hand, if the corrected pixel value S' and the corrected pixel value M1' are not the same (NO in S1000), the determiner 108 determines that a flicker has occurred (S1008). The determiner 108 determines that a flicker has occurred on the premise that the corrected pixel value M1' has not been saturated. While the determination processing has been performed using the pixel value L, the pixel value M1, and the pixel value S within the same pixel, the present invention is not limited to this. For example, determination processing may be performed using an average value of long exposure pixels, an average value of medium exposure pixels, and an average value of short exposure pixels within a predetermined range.

If the corrected pixel value S' and the corrected pixel value M1' are the same, the determiner 108 can determine whether a blur has occurred or a situation is normal by comparing the pixel value L with the corrected pixel value S' or the corrected pixel value M1'. Thus, it can be determined that the pixel value L in the long exposure image has been saturated without comparing the pixel value L with the corrected pixel value. If the corrected pixel value S' and the corrected pixel value M1' differ from each other, it can be determined that a flicker has occurred on the premise that the corrected pixel value M1' has not been saturated.

As described above, according to the present embodiment, if the pixel value L in the long exposure image has been saturated, and the corrected pixel value S' in the short exposure image is less than the pixel value L, when HDRI is performed using a predetermined pixel value larger than the corrected pixel value S', an effect of a flicker can be reduced, and a high dynamic range image can be obtained.

At least a part of the image processor 1 in the above embodiments may be formed of hardware or software. In the case of software, a program realizing at least a partial function of the image processor 1 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the image processor 1 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processor comprising:
   an acquirer configured to acquire a first pixel value obtained by making a pixel value in a first image captured in a first exposure time correspond to a predetermined sensitivity, a second pixel value obtained by making a pixel value in a second image captured in a second exposure time shorter than the first exposure time correspond to the predetermined sensitivity, and a third pixel value obtained by making a pixel value in a third image captured in a shorter exposure time than the first exposure time and captured in a longer exposure time than the second exposure time correspond to the predetermined sensitivity;
   a synthesizer configured to synthesize the first pixel value and the second pixel value in a predetermined ratio to obtain a composite value;

an output unit configured to output the third pixel value as a predetermined value when the third pixel value has been saturated and the composite value is less than the third pixel value; and a generator configured to generate a high dynamic range image using at least the first image and the second image based on the predetermined value output by the output unit.

2. The image processor according to claim 1, wherein the output unit outputs the composite value as the predetermined value when the third pixel value has been saturated and the composite value is not less than the third pixel value.

3. The image processor according to claim 1, further comprising a determiner configured to determine that a blur has occurred when a difference between the second pixel value and the third pixel value is within a predetermined range of value and a difference between the first pixel value and the second pixel value exceeds a predetermined value.

4. The image processor according to claim 1, wherein the output unit outputs the first pixel value when the first pixel value and the third pixel value have been saturated and the second pixel value is less than the first pixel value.

5. The image processor according to claim 4, wherein the output unit outputs the second pixel value when the first pixel value and the third pixel value have been saturated and the second pixel value is not less than the first pixel value.

6. The image processor according to claim 4, wherein the output unit outputs a composite value obtained by synthesizing the second pixel value and the third pixel value in a predetermined ratio as the predetermined value when the first pixel value has been saturated and the third pixel value is not less than the first pixel value.

7. The image processor according to claim 1, wherein the output unit outputs the third pixel value as the predetermined value when the third pixel value has not been saturated.

8. The image processor according to claim 1, wherein the output unit outputs the predetermined value larger than the second pixel value when the first pixel value has been saturated and the second pixel value corresponding to the first pixel value is less than the first pixel value.

9. The image processor according to claim 1, wherein the output unit outputs the first pixel value as the predetermined value.

10. The image processor according to claim 1, wherein the output unit outputs a pixel value, which is not less than a saturated pixel value of the first pixel value and less than a saturated pixel value of the second pixel, as the predetermined value.

11. The image processor according to claim 1, wherein
the predetermined sensitivity is a value based on the first exposure time,
the acquirer acquires the pixel value in the first image as the first pixel value, and
the acquirer acquires as the second pixel value a pixel value obtained by subjecting the pixel value in the second image to correction for making the first exposure time and the second exposure time corresponds to each other.

12. The image processor according to claim 1, further comprising a determiner configured to determine whether the first pixel value has been saturated and determine whether the second pixel value is less than the first pixel value when the first pixel value has been saturated.

13. The image processor according to claim 5, wherein the determiner determines that the first pixel value has been saturated when the pixel value in the first image is or over the predetermined value or when the first pixel value is or over the predetermined value.

14. The image processor according to claim 1, wherein the output unit outputs the second pixel value as the he predetermined value when the first pixel value has been saturated and the second pixel value is not less than the first pixel value.

15. The image processor according to claim 1, further comprising
a synthesizer configured to synthesize the first pixel value and the second pixel value in a predetermined ratio to obtain a composite value,
wherein the output unit outputs the composite value as he predetermined value when the first pixel value has not been saturated.

16. The image processor according to claim 1, further comprising a determiner configured to determine that a flicker has occurred in the second pixel value when the first pixel value is saturated and the second pixel value corresponding to the first pixel value is less than the first pixel value.

17. An image processing method comprising:
acquiring a first pixel value obtained by making a pixel value in a first image captured in a first exposure time correspond to a predetermined sensitivity and a second pixel value obtained by making a pixel value in a second image captured in a second exposure time shorter than the first exposure time correspond to the predetermined sensitivity;
acquiring a third pixel value obtained by making a pixel value in a third image captured in a third exposure time shorter than the first exposure time and longer than the second exposure time correspond to the predetermined sensitivity, and further comprising determining that a blur has occurred when the second pixel value and the third pixel value are equal to each other and the first pixel value differs from the second pixel; and
determining that a flicker has occurred in the second pixel value when the first pixel value is saturated and the second pixel value corresponding to the first pixel value is less than the first pixel value.

18. The image processing method according to claim 17, further comprising
outputting a pixel value serving as a predetermined value larger than the second pixel value when the first pixel value has been saturated and the second pixel value corresponding to the first pixel value is less than the first pixel value; and
generating a high dynamic range image using at least the first image and the second image based on the pixel value output.

* * * * *